April 8, 1947. M. MALLORY Re. 22,863

INTERNAL COMBUSTION ENGINE

Original Filed Dec. 4, 1941 2 Sheets-Sheet 1

INVENTOR.
MARION MALLORY

BY
Barnes, Kisselle, Laughlin & Raisch

April 8, 1947. M. MALLORY Re. 22,863

INTERNAL COMBUSTION ENGINE

Original Filed Dec. 4, 1941 2 Sheets-Sheet 2

INVENTOR.
MARION MALLORY

BY Barnes, Kisselle, Laughlin & Raisch

Reissued Apr. 8, 1947

Re. 22,863

UNITED STATES PATENT OFFICE 22,863

INTERNAL-COMBUSTION ENGINE

Marion Mallory, Detroit, Mich.

Original No. 2,345,056, dated March 28, 1944, Serial No. 421,608, December 4, 1941. Application for reissue March 6, 1946, Serial No. 652,295

27 Claims. (Cl. 123—51)

This invention relates to an internal combustion engine.

As is well known, in the present day engine the compression is at its maximum when the crankshaft is on center. Naturally the maximum explosive force occurs at a time when it does not have the greatest leverage over the crankshaft. It is an object of my invention to provide an engine wherein the maximum explosive force occurs when the crankshafts are in such positions that the explosive force will have a much greater and more favorable leverage on the crankshafts than in the known conventional engine.

It is well known that in the present two-cycle engine, it is impossible to force in a carburetted charge; that is, force the fuel and air in at the same time, unless the exhaust valve is open during charging time. This being true makes it practically impossible to fully charge a two-cycle engine with a carburetted charge without overcharging. In other words, if a sufficient carburetted charge is forced in the engine to completely scavenge the exhaust, some of the carburetted charge is bound to pass out of the exhaust port before it is closed. In a four-cycle engine, this difficulty does not arise. Another object of the invention is to utilize the good features of a four-cycle engine and two-cycle engine as much as possible and eliminate the undesirable features of both. My engine could be considered a cross between a four-cycle and a two-cycle engine because it has a cylinder, a crankshaft located at each end of the cylinder, two pistons reciprocating in the cylinder, one from one crankshaft and one from the other crankshaft. The explosion takes place every second stroke of one piston and every fourth stroke of the other piston. Due to the fact that one piston makes two strokes to one of the other piston, a pressure is created in the cylinder by the faster moving piston at exhaust intervals to assist in forcing out the exhaust gases, and a vacuum will be created in the cylinder at intake intervals to assist in drawing in the charge.

It is well known that solid injection of the fuel is used with two-cycle engines and injected on the compression stroke at a time the exhaust valve is closed to prevent fuel from passing out of the exhaust valve. However, solid injection does not atomize the fuel well unless hot spots are used to assist the atomization and when heating devices for atomizing the fuel are located in the combustion chamber, exposed to the charge on the compression stroke, the charge is overheated, resulting in a power loss. Hot spots in the combustion chamber also cause preignition, preventing the use of extremely high compression. Another object is to produce an engine whereby the spark plug that is used for ignition or hot spots used to assist atomization and produce ignition are isolated from the combustion chamber during the compression stroke until ignition time to prevent overheating the charge on the compression stroke and preignition.

Figure 7:
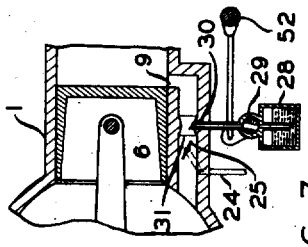
Figs. 5, 6 and 7 are detail sectional views of the engine showing modified forms of means for fueling the engine.

Referring more particularly to the drawings the various parts of the engine are designated by the following numerals: 1 is the cylinder. 2 and 3 are crankshafts rotatably supported in the conventional way. 4 and 5 are crank throws on the crankshafts 3 and 2 respectively. 6 and 7 are opposed pistons reciprocably mounted in the cylinder 1. 8 is an exhaust port. 9 and 10 are intake ports to the cylinder and 11 an intake valve that controls port 9. Port 10, in the present instance, is in communication with the interior of the crankcase 42 through passage 44, and the port 10 is in communication with a carbureted fuel supply source. 12 is a cam which operates push rod 13 and rocker arm 14 which actuate valve 11 in a conventional manner. 15 is the usual valve spring for closing valve 11. 16 is the conventional carburetor in connection with the port 10. 17 is a valve for controlling air inlet port 41 in crankcase 42. Valve 17 is opened by suction or vacuum created in the crankcase 42 and is closed by the valve spring 43. 18 is a spark plug. 19 is a gear fixed on crankshaft 2. 21 is a gear fixed on crankshaft 3 and 20 is an intermediate gear which meshes with both gears 19 and 21. The gear ratio is such that gear 19 makes two revolutions to a single revolution of gear 21. 22 is the combustion chamber. 26 is a throttle valve for the carburetor. 25 is a throttle valve for the passageway 44 leading from the crankcase 42 into the cylinder 1. Rod 24 connects the throttle valves 25 and 26 so that they open and close in unison.

*The operation of the engine*

Referring to Figs. 1, 2, 3 and 4. What takes place in the engine will be described by the progressive strokes of the two pistons during one complete cycle of the engine starting from the positions of the pistons shown in Fig. 1. In this figure, the piston 6 has compressed the charge in the combustion chamber 22 against piston 7 to its maximum, and explosion takes place at this point. It can be seen that the crankshaft throw 4 is past center, which gives the explosion force great leverage in turning power on the crankshaft. With my engine considerable latitude in the position of crank throw 4 beyond top dead center at maximum explosive force is permissible. Preferably, but not necessarily, the throw 4 at this time is positioned between 30° and 60° beyond top dead center. As shown, the crank throw 4 is about 45° beyond top dead center. However, crank throw 5 at the maximum explosive force is preferably at or near top dead center. The important thing is that with my type of engine the crank throws 4 and 5 can be positioned with respect to their top dead centers at the time of greatest explosive force so that the explosive force can obtain a much greater leverage or leverage advantage in acting on the crankshafts 2 and 3 than is possible with engines heretofore known. This is particularly true with respect to piston 7 and its crankshaft.

Figure 2:
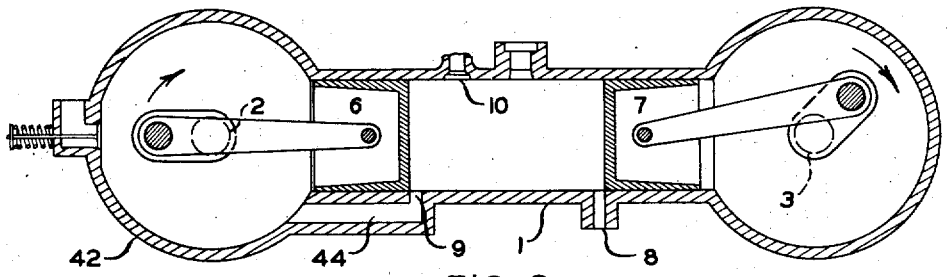
Fig. 2 is a sectional view of the engine showing the position of the parts at the end of the power stroke.

The explosion forces the pistons apart, with the slow moving piston 7 moving outward on its power stroke to position to open the exhaust port 8, which opening occurs when its crank is approximately 45° short of bottom dead center and during which time the fast moving piston is completing its outstroke and its crank is moving to its outer or bottom dead center. Both the air intake port 9 and the exhaust port 8 are open at this position, as shown in Fig. 2. The compressed air which piston 6 has compressed in crankcase 42 now rushes in through port 9, forcing part of the exhaust gases out of port 8.

Figure 3:
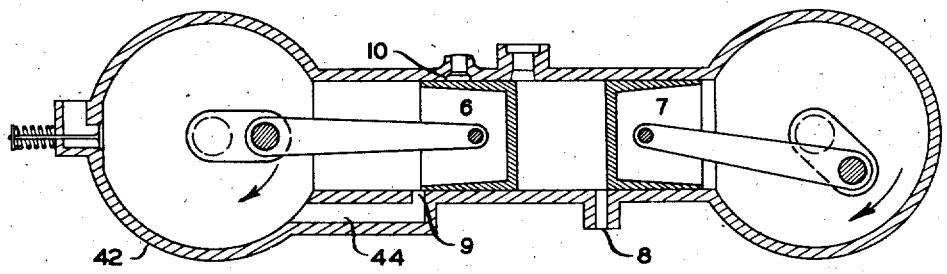
Fig. 3 is a section through the engine showing the position of the parts at the end of the exhaust stroke.

When the next stroke of piston 6 is completed, as shown in Fig. 3, the air that came into the cylinder 1 through port 9 (when pistons 6 and 7 were in position shown in Fig. 2) is moved toward piston 7 thereby forcing the remainder of the exhaust gases out of port 8.

Figure 4:
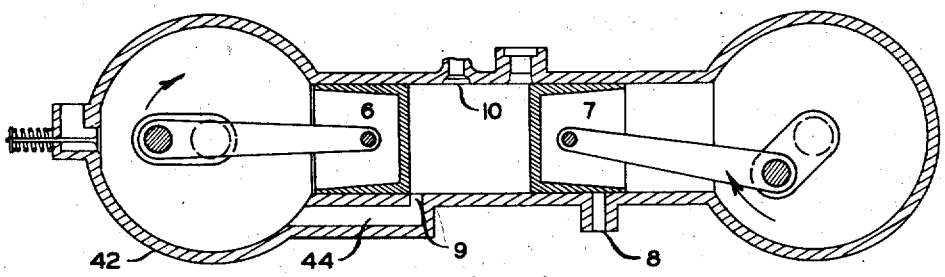
Fig. 4 is a section through the engine showing the position of the parts at the end of the intake stroke.

While piston 6 completes another outstroke, as shown in Fig. 4, piston 7 advances approximately three-quarters of its in, or combination exhaust and compression stroke, closing the exhaust port 8 and moving to near the end of its compression action. Due to the fact that piston 6 travels twice as fast as piston 7, there will be a vacuum created between the two pistons before piston 6 uncovers port 9. At this time, cam 12 (Fig. 1) will have raised push rod 13 against rocker arm 14 to open valve 11, permitting a rich charge to be drawn into the cylinder through carburetor 16 and port 10. Preferably valve 11 is opened before piston 6 uncovers port 10 and cam 12 permits spring 15 to begin closing valve 11 before the piston completely clears port 10. This facilitates charging of the cylinder with a rich charge. The valve 11 closes before piston 6 uncovers port 9. When port 9 is uncovered, the air rushing in from crankcase 42 through passageway 44 dilutes the rich mixture and makes a combustible charge. As piston 6 makes another complete stroke while piston 7 makes only one-half stroke, piston 6 will catch up with piston 7 and thereby compress the charge to its maximum when crank throw 4 has moved past center at position shown in Fig. 1. The engine has completed one cycle. The compression is at its maximum and explosion is ready to begin. In this form, valves 25 and 26, which are connected together by rod 24, operate in unison to throttle the engine.

It is apparent that in the operation of the engine the air charge port 9 is opened twice to admit charges to the cylinder during each cycle of operations, consisting of one full revolution of the crank 4 and two of the crank 5. This is important for an efficient and economical running of the engine. The admission of an air charge on the first opening of such port assists in an efficient scavenging of the exhaust gases from the cylinder while the exhaust port 8 is open. The second opening of port 9 occurs after a closing of the exhaust port by the slow piston 7 and a recession of the piston 6 on its outward stroke from the piston 7, which recession movement is twice as fast as the concurrent inward movement of the slow piston. This recession action tends, at least partially, to relieve the compression effected by the initial inward movement of the slow piston so that the cylinder is in better condition for receiving the air charge to support combustion and for increased compression than if the air in the cylinder was under quite high compression at the time the port 9 was uncovered. In other words, the reduction in the compression pressure during the compressing action prevents back pressure in the crankcase through the port and its passage 44 when the port 9 is opened. Easy breathing action is thus provided and the advantage of admitting an air charge to the cylinder after closing of the exhaust and during a compression stroke of piston 7 obtained.

Figure 5:
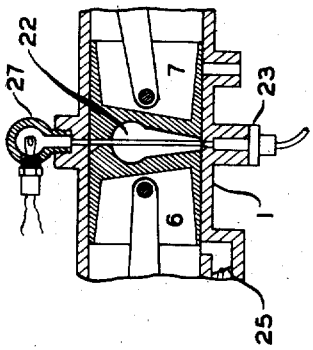
Figure 6:
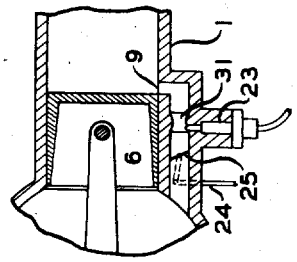

Figs. 5, 6 and 7 show the different means of fueling my engine. In these figures, carburetor 16 and port 10 are not used. These different means are made possible by the design of the engine itself, and it is very desirable that the different fuel methods can be used on the engine because different kinds of fuels can be used and the engine can be operated as a self-ignited, solid fuel injection engine, or it can be operated as a low compression injection spark ignited engine, or a low compression spark ignited engine using a carburetted charge.

In Fig. 5, the fuel is injected into the combustion chamber 22 on the compression stroke by injection nozzle 23 and the ordinary engine driven injection pump, which is not deemed necessary to show, using a hot spot or glow plug 27 to atomize the fuel and cause ignition. It can be seen that hot spot or glow plug 27 is not exposed to the compressed charge until time for ignition because piston 7 does not uncover the spark plug or glow plug until practically all of the clearance is taken up between the two pistons on the compression stroke. The glow plug can be electrically heated or heated by the explosion of the engine, whichever is desirable.

Figure 1:
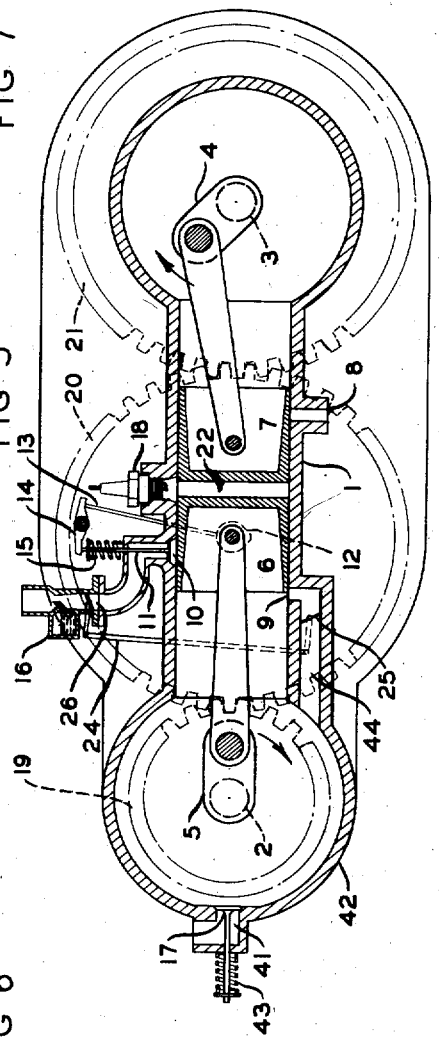
Fig. 1 is a section through the engine showing the position of the parts after the completion of the compression stroke and at the beginning of the firing stroke.

In Fig. 6, injection nozzle 23 is located adjacent to intake port 9, and the atomization is done by high velocity of the air through the venturi 31, injection taking place when pistons 6 and 7 are in position shown in Fig. 4. Spark plug 18 shown in Fig. 1 is used for ignition. It will be understood that injection does not take place when pistons 6 and 7 are in position shown in Fig. 2, because if this were the case, the unburnt charge would be forced into the exhaust charge and some of it would pass out of port 8.

In Fig. 7, the injection pump is not used, and neither are carburetor 16 and intake port 10. Valve 29 is operated by engine driven cam 52, similar to the operation of valve 11 in Fig. 1, and, as port 9 is opened by piston 6 (when piston 7 is in the position shown in Fig. 4), valve 29 is moved by cam 52 to open communication between fuel bowl 28 and nozzle 30. The high velocity air passing through venturi 31 creates a suction in nozzle 30, and the carburetted charge is blown into the cylinder. In this form, spark plug 18 shown in Fig. 1 is used for ignition.

*Throttling the engine*

When injection alone is used (Figs. 5 and 6), the engine is throttled by valve 25 and rod 24 is connected to the metering pin of an injection pump to increase or decrease the amount of fuel supplied to the engine as the air is increased or decreased by throttle 25. This system of admitting air and fuel in unison is old, and it is not deemed necessary to show the rod 24 connected to the metering pin of a fuel pump. When the method of fueling shown in Fig. 7 is used, throttle valve 25 does the throttling of the engine.

It will be understood that this engine can be built in any desirable number of units. For example; a six cylinder engine would consist of twelve pistons and two crankshafts, each crankshaft operating six pistons. It will also be understood that any suitable pressure means can be used for charging the engine with air other than crankcase pressure.

What I claim is:

1. In an internal combustion engine having a cylinder with open ends, a crankshaft located at each end of said cylinder, a piston connected to each of said crankshafts, said crankshafts being geared together with a ratio of two-to-one to cause one of the pistons to make four strokes in said cylinder while the other piston makes two strokes to produce one compression stroke every revolution to one of the crankshafts and every other revolution of the other crankshaft, said maximum compression occurring at a time when the faster traveling crankshaft is on or at near dead center and the slower traveling crankshaft is considerably past dead center, an engine operated injection nozzle located near the center of said cylinder, a hot spot or atomizing plug located in said cylinder at a position that it will remain covered or isolated from the compressed charge by the slower traveling piston until near or at ignition time, said injection nozzle being timed to inject fuel on the compression stroke.

2. In an internal combustion engine having a cylinder with open ends, a crankshaft located at each end of said cylinder, a piston connected to each of said crankshafts, said crankshafts being geared together with a ratio of two-to-one to cause one of the piston to make four strokes in said cylinder while the other piston makes two strokes to produce one compression stroke every revolution of one of the crankshafts and every other revolution of the other crankshaft, said maximum compression occurring at a time when the faster traveling crankshaft is on or at near dead center and the slower traveling crankshaft is considerably past dead center, said pistons being shaped to form a combustion chamber between them, an ignition chamber having a communication with the combustion chamber covered and uncovered by the slower traveling piston so that said ignition chamber communicates with said combustion chamber only when the compression is near its maximum or the desired ignition time, and an engine driven injection nozzle timed to inject fuel into the combustion chamber on the compression stroke.

3. In an internal combustion engine having a cylinder with open ends, a crankshaft located at each end of said cylinder, a piston connected to each of said crankshafts, said crankshafts being geared together with a ratio of two-to-one to cause one of the pistons to make four strokes in said cylinder while the other piston makes two strokes, an exhaust port in said cylinder uncovered by the slower traveling piston near the end of its inward stroke away from the other piston, an air pressure charged intake port in said cylinder uncovered by the faster traveling piston to admit an air charge near the end of each inward stroke thereof away from the slower traveling piston.

4. In an internal combustion engine having a cylinder with open ends, a crankshaft located at each end of said cylinder, a piston connected to each of said crankshafts, said crankshafts being geared together with a ratio of two-to-one to cause one of the piston to make four strokes in said cylinder while the other piston makes two strokes, an exhaust port in said cylinder uncovered by the slower traveling piston near the end of each inward stroke away from the other piston, an intake port for admitting air under pressure into said cylinder, uncovered by the faster traveling piston near the end of at least one inward stroke away from said slower traveling piston, a carburetor, a third port in said cylinder communicating with said carburetor, an intake valve in said third port arranged to open at every other stroke of the faster traveling piston to admit a fuel charge into the cylinder and at a time the exhaust port is covered by the slower traveling piston and before faster traveling piston has uncovered said air intake port, a throttle valve for said carburetor, and a throttle valve for said air intake port, said throttle valves being connected together so as to operate in unison.

5. In an internal combustion engine having a cylinder with open ends, a crankshaft located at each end of said cylinder, a piston connected to each of said crankshafts, said crankshafts being geared together with a ratio of two-to-one to cause one of the pistons to make four strokes in said cylinder while the other piston makes two strokes, an exhaust port in said cylinder uncovered by the slower traveling piston near the end of its inward stroke, an intake port in said cylinder uncovered by the faster traveling piston near the end of at least one inward stroke to admid air under pressure into said cylinder, a fuel injection nozzle communicating with said air intake port for injecting fuel through said nozzle at every other stroke of the faster traveling piston and at a time when the slower traveling piston has said exhaust port covered, and throttling means for throttling air to said cylinder through said intake port.

6. In an internal combustion engine having a cylinder with open ends, a crankshaft located at each end of said cylinder, a piston connected to each of said crankshafts, said crankshafts being geared together with a ratio of two-to-one to cause one of the piston to make four strokes in said cylinder while the other piston makes two strokes, an exhaust port in said cylinder uncovered by the slower traveling piston near the end of its inward stroke away from the other piston, an air pressure charged intake port in said cylinder uncovered by the faster traveling piston near the end of each inward stroke away from the slower moving piston, a conduit communicating with said cylinder and charged with compressed air, a nozzle located in said conduit, said nozzle communicating with the source of fuel, a valve between said nozzle and the source of fuel, said valve being operated to open communication between said nozzle and source of fuel at every other stroke of the faster traveling piston and at a time said intake port is uncovered by the faster traveling piston and said exhaust port is covered by the slower traveling piston.

7. In an internal combustion engine having a cylinder with open ends, a crankshaft located at each end of said cylinder, a piston connected to each of said crankshafts, said crankshafts being geared together with a ratio of two-to-one to cause one of the pistons to make four strokes in said cylinder while the other piston makes two strokes, an intake port controlled by the faster traveling piston, said intake port opening near the end of each inward travel of the said piston away from the slower traveling piston, an exhaust port controlled by the slower traveling piston and opening near the end of the inward travel of the slower traveling piston away from the faster traveling piston, the said pistons traveling in the same direction during the intake stroke of the engine but the faster traveling piston drawing away from the slower traveling piston whereby a partial vacuum is created in the cylinder for drawing a fluid charge into the cylinder when the faster traveling piston uncovers said intake port.

8. In an internal combustion engine having a cylinder with open ends, a crankshaft located at each end of said cylinder, a piston connected to each of said crankshafts, said crankshafts being geared together with a ratio of two-to-one to cause one of the pistons to make four strokes in said cylinder while the other piston makes two strokes, said strokes of said pistons being equal, the said pistons being arranged with respect to their crankshafts so that when the faster traveling piston and crankshaft are on top dead center the slower traveling piston and its crankshaft are positioned beyond top dead center a distance falling within a range of from about 30° to 90°.

9. In an internal combustion engine having a cylinder, opposed pistons in said cylinder, the first piston making four strokes in said cylinder while the second piston makes two strokes in said cylinder during each complete cycle of the engine, an exhaust port and a separate intake port for said cylinder arranged to open and close whereby every other stroke of the second piston is a compression stroke and every fourth stroke of the first piston is a compression stroke, said second piston controlling the exhaust port so that the exhaust port is opened at the end of the power stroke and closed only during the compression and power strokes of the second piston, the first piston controlling the intake port so that the said port is opened to admit air charges at the end of the power and intake strokes and closed during the compression and power strokes of said first piston, and means for supplying fuel to said cylinder during a portion of the intake stroke of the first piston and while the exhaust port is closed.

10. In an internal combustion engine having a cylinder, crankshafts located at opposite ends of said cylinder, opposed pistons in said cylinder, the first piston being connected to the one crankshaft and the second piston to the other crankshaft, said crankshafts being connected together for rotation with a ratio of two-to-one to cause the first of the pistons to make four strokes in said cylinder while the second piston makes two strokes, whereby the crankshaft for the first piston travels 180° during each power, exhaust, intake and compression stroke of said first piston and the crankshaft for the second piston travels 90° during each power, exhaust, intake and compression travel of said second piston, an exhaust port for the cylinder which is controlled by the second piston so that the exhaust port is closed during the compression and power strokes of the engine and opened during the exhaust stroke, and an intake port for said cylinder which is controlled by the first piston and is opened by the first piston only at the end of the power stroke and at the end of the intake stroke of the first piston.

11. In an internal combustion engine having a cylinder, crankshafts located at opposite ends of said cylinder, opposed pistons in said cylinder, the first piston being connected to the one crankshaft and the second piston to the other crankshaft, said crankshafts being connected together for rotation with a ratio of two-to-one to cause the first of the pistons to make four strokes in said cylinder while the second piston makes two strokes, whereby the crankshaft for the first piston travels 180° during each power, exhaust, intake and compression stroke of said first piston and the crankshaft for the second piston travels 90° during each power, exhaust, intake and compression travel of said second piston, an exhaust port for said cylinder controlled by the second piston so that the exhaust port is opened at the end of the power travel of the first and second pistons and closed only during the compression and power travels of the first and second pistons an air intake port for said cylinder controlled by the first piston so that it is opened at the end of the power and intake strokes and closed during the compression, exhaust and power strokes of the first piston, and means for supplying fuel to said cylinder during the intake stroke of the first piston and while the exhaust port is closed.

12. In an internal combustion engine having a cylinder with open ends, a crankshaft located at each end of said cylinder, a piston connected to each of said crankshafts, said crankshafts being geared together with a ratio of two-to-one to cause one of the pistons to make four strokes in said cylinder while the other piston makes two strokes, an exhaust port in said cylinder uncovered by the slower traveling piston near the end of its inward stroke, an intake port in said cylinder uncovered by the faster traveling piston near the end of each inward stroke, pressure means for forcing air into the cylinder each time the air intake port is opened whereby said pressure means assists in the exhausting of the cylinder when the exhaust port is opened and assists in charging the cylinder when the exhaust port is closed, said faster traveling piston traveling toward the slower traveling piston while the exhaust port is opened to also assist in exhausting the cylinder, said faster traveling piston also traveling away from the slower traveling piston on the intake stroke to create a sub-atmospheric pressure in the cylinder and thereby assist in drawing the charge into the cylinder.

13. In an internal combustion engine having a cylinder, an exhaust port located in one end of the cylinder, an intake port located in the other end of the cylinder, two pistons opposing each other in said cylinder, one piston making four strokes in said cylinder while the other piston makes two strokes in said cylinder during each complete cycle of the engine, said intake port being opened twice and closed twice by the first named piston every cycle of the engine, said exhaust port being opened once and closed once by the second named piston every cycle of the engine whereby every fourth stroke of the first named piston is a compression stroke and every second stroke of the second named piston is a compression stroke, said strokes of said pistons being equal, means for forcing an air charge into the cylinder the first time said intake port opens during each cycle to assist scavenging of the engine and for forcing a fuel charge into the cylinder the second time said intake port opens during each cycle.

14. The combination as claimed in claim 10 wherein the cylinder is provided with an air intake port through which air under pressure flows into the cylinder, said air intake port being controlled by the first piston so that it is opened at the end of the power stroke and again at the end of the intake stroke and maintained closed during the compression, power and exhaust strokes of said first piston.

15. In an internal combustion engine wherein combustion occurs between two pistons operating in a common cylinder and connected at opposite ends of the cylinder to separate crankshafts geared together with a ratio of two-to-one with the slower moving piston controlling an exhaust port and the faster moving piston controlling an air charge inlet port, means for supplying air under pressure to said inlet port, said inlet port being opened by its piston to admit a scavenging air charge to the cylinder when the exhaust port is opened by its piston at the end of a power stroke and being again opened by its piston after a closing of the exhaust port and before the slow traveling piston has reached the end of its compression stroke to admit an air charge for compression and to support combustion.

16. An arrangement as called for in claim 15 with the second opening of the inlet port occurring during the compression stroke of the slow piston and after a predetermined recession of the fast piston from the slow piston during the concurrent outstroke of the former whereby the cylinder pressure is relieved an extent sufficient to prevent back pressure through the inlet port when opened.

17. An arrangement as called for in claim 15 wherein the faster moving piston operates to compress air for the air charges.

18. An arrangement as called for in claim 15 wherein the air supplying means includes the faster moving piston and the crank case for the faster moving crankshaft with a valve controlled air inlet thereto whereby the faster moving piston operates to draw air into and compress it in the crank case.

19. In an internal combustion engine wherein combustion occurs between two pistons operating in a common cylinder and connected at opposite ends of the cylinder to separate crankshafts geared together with a ratio of two-to-one with the slower moving piston controlling an exhaust port and the faster moving piston controlling a charge inlet port, means for supplying air under pressure to said inlet port, said inlet port being opened by its piston to admit charges to the cylinder once for each revolution of its crankshaft with the openings occurring approximately 180° apart in a revolution of the slow turning crankshaft.

20. In an internal combustion engine wherein combustion occurs between two pistons operating in a common cylinder and connected at opposite ends of the cylinder to separate crankshafts geared together with a ratio of two-to-one with the slow moving piston controlling an exhaust port and the fast moving piston controlling an air charge inlet port, and with its crankshaft traveling 180° for each power, exhaust, intake and compression stroke of the piston, while the crankshaft of the slow moving piston travels 90° during each such stroke of the fast piston, said inlet port being opened by its piston to admit an air charge to the cylinder at the ends of both the exhaust and the intake strokes of such fast piston whereby the movement of the slow crankshaft during the total period of opening of the inlet port and during which air charges are admitted is more than 90°.

21. In an internal combustion engine wherein combustion occurs between two pistons operating in a common cylinder and connected at opposite ends of the cylinder to separate crankshafts geared together with a ratio of two-to-one with the slow moving piston controlling an exhaust port and the fast moving piston controlling an air charge inlet port, and with its crankshaft traveling 180° for each power, exhaust, intake and compression stroke of the piston, while the crankshaft of the slow moving piston travels 90° during each such stroke of the fast piston, said inlet port being opened by its piston to admit an air charge to the cylinder at the ends of both the exhaust and the intake strokes of such fast piston whereby the movement of the slow crankshaft during the total period of opening of the inlet port and during which air charges are admitted is approximately 180°.

22. In an internal combustion engine wherein combustion occurs between two pistons operating in a common cylinder and connected at opposite ends of the cylinder to separate crankshafts geared together with a ratio of two-to-one with the slow moving piston controlling an exhaust port and the fast moving piston controlling an air charge inlet port, and with its crankshaft traveling 180° for each power, exhaust, intake and compression stroke of the piston, while the crankshaft of the slow moving piston travels 90° during each such stroke of the fast piston, means for constantly supplying air under charge pressure to said inlet port whereby a charge is admitted to the cylinder each time the port is uncovered, the total air charge admission to the cylinder for a cycle of operations of the engine occurring throughout substantially 180° of movement of the slow turning crankshaft.

23. In an internal combustion engine wherein combustion occurs between two pistons operating in a common cylinder and connected at opposite ends of the cylinder to separate crankshafts geared together with a ratio of two-to-one with the slow moving piston controlling an exhaust port and the fast moving piston controlling an air charge inlet port, and with its crankshaft traveling 180° for each power, exhaust, intake and compression stroke of the piston, while the crankshaft of the slow moving piston travels 90° during each such stroke of the fast piston, means operable by the fast traveling piston to supply air under charge pressure to said inlet port whereby a charge is admitted to the cylinder each time the port is uncovered, the total period of uncovering of the port during a cycle of operations occurring during approximately 180° of movement of the slow crankshaft and 360° of movement of the other crankshaft.

24. In an internal combustion engine wherein combustion occurs between two pistons operating in a common cylinder and connected at opposite ends of the cylinder to separate crankshafts geared together with a ratio of two-to-one with the slower moving piston controlling an exhaust port and the faster moving piston controlling an air charge inlet port, and the case for the faster turning crankshaft is opened to the adjacent cylinder end, said case having a check valve controlled air inlet and having communication with said inlet port, and said faster moving piston operating to draw air into the case through said opening and compress it in the case, said inlet port being opened by its piston to admit a scavenging air charge to the cylinder when the exhaust port is opened by its piston at the end of a power stroke and being again opened by its piston during a compression stroke of the other piston and after a closing of the exhaust port to admit an air charge to the cylinder to support combustion.

25. In an internal combustion engine wherein combustion occurs between two pistons operating in a common cylinder and connected at opposite ends of the cylinder to separate crankshafts geared together with a ratio of two-to-one with the slower moving piston controlling an exhaust port and the faster moving piston controlling an air charge inlet port, means for supplying air under pressure to said inlet port including a passage to the port, and throttle means in said passage, said inlet port being opened by its piston to admit a scavenging air charge to the cylinder when the exhaust port is opened by its piston at the end of a power stroke and being again opened by its piston during a compression stroke of the other piston and after a closing of the exhaust port to admit an air charge to support combustion.

26. In an internal combustion engine wherein combustion occurs between two pistons operating in a common cylinder and connected at opposite ends of the cylinder to separate crankshafts geared together with a ratio of two-to-one with the slower moving piston controlling an exhaust port and the faster moving piston controlling an air charge inlet port, means for supplying air under pressure to said inlet including a passage to the port, and means for injecting fuel charges into said passage at predetermined intervals in a running of the engine, said inlet port being opened by its piston to admit a scavenging air charge to the cylinder when the exhaust port is opened by its piston at the end of a power stroke and being again opened by its piston during a compression stroke of the other piston and after a closing of the exhaust port to admit an air charge to support combustion.

27. An arrangement as called for in claim 26 together with a throttle valve in said passage.

MARION MALLORY.